350-271. XR 3549826 SR

United States Patent

[11] 3,549,826

[72] Inventor Iben Browning
Sunnyvale, Calif. 94022 (745 Distel Drive,
Los Altos, Calif.)

[21] Appl. No. 626,325
[22] Filed Mar. 27, 1967
[45] Patented Dec. 22, 1970

[54] APPARATUS FOR READING INFORMATION IN THE FORM OF LIGHT REFLECTIVE AREAS ON A CARRIER
1 Claim, 9 Drawing Figs.

[52] U.S. Cl. .......... 179/100.3, 350/271
[51] Int. Cl. .......... G11b 7/08, G11b 21/04
[50] Field of Search .......... 179/100.3, 100.3B, 100.3E, 100.3O, 100.3L, 100.3V; 172/100.41L; 280/227; 280/236; 119/100.LT; 350/271; 35/288

[56] References Cited
UNITED STATES PATENTS

| | | | |
|---|---|---|---|
| 3,251,952 | 5/1966 | Schomer .......... | 179/100.3 |
| 2,059,550 | 11/1936 | Champion .......... | 179/100.3 |
| 3,243,522 | 3/1966 | Maurer .......... | 179/100.2 |

*Primary Examiner*—J. Russell Goudeau
*Attorney*—Limbach, Limbach & Sutton

ABSTRACT: Apparatus and a method for reading out information printed or otherwise carried on a surface in the form of areas having different light reflectivities with the areas extending across the surface in an orderly arrangement. The information is retrieved or read out by directing light continuously onto and across the surface in scanning relationship to the areas and the light reflected from these areas is directed to a photosensitive device coupled to means for converting an electronic signal to an observable form. The incident and reflected light paths can be substantially coincident and means arranged progressively to attenuate the amplitude of the signal at the ends of successive rows of information areas.

INVENTOR.
IBEN BROWNING
BY Townsend and Townsend
ATTORNEYS

INVENTOR.
IBEN BROWNING
BY Townsend and Townsend
ATTORNEYS

INVENTOR.
IBEN BROWNING
BY Townsend & Townsend
ATTORNEYS

APPARATUS FOR READING INFORMATION IN THE FORM OF LIGHT REFLECTIVE AREAS ON A CARRIER

This invention relates to improvements in optically retrieving information from an information storage unit and, more particularly, to an improved optical method and apparatus for reading out information defined by surface areas having different light reflecting properties.

The present invention resides in apparatus and a method for obtaining information from a data storage unit whose informational content resides in a plurality of rows of surface areas having different light reflectivities. These rows and areas are arranged in an order determined by the information represented thereby, the lightness and darkness of the areas defining certain characters or other indicia comprising the informational content of the storage unit.

To retrieve the information represented by these areas and to put the information in a usable form, a beam of light is directed onto the storage unit and is moved across each row of areas without interruption. Light is reflected from the areas by an amount corresponding to their respective light reflectivities which, for a particular light source, remains constant. The reflected light is sensed and converted into a signal which actuates a device for placing the information in an observable form. Successive rows of areas are scanned in this way until all of the information has been retrieved from the storage unit.

A progressively attenuating structure is used at the ends of each row when the information is to be converted into sound or an optical display. This structure avoids a sudden increase in signal amplitude at the beginning of each row of informational areas and a sudden decrease in signal amplitude at the end of the row. If sound is to be produced, an objectionable click would be heard at the beginning and end of the scanning of a row if such structure were not used.

One embodiment of the apparatus for carrying out the teachings of the invention includes a light pipe having one end in proximity to or in optical contact with a storage unit, such as a card or sheet and on which the light and dark informational areas are placed in some suitable manner. A source of light at the opposite end of the light pipe permits light to pass therethrough and onto the card or sheet from which the light may immediately be reflected. The reflected light returns to and passes at least partially through the light pipe. Light sensing structure coupled with the light pipe intercepts or otherwise receives at least a portion of the reflected light and changes it into an electronic signal. This signal is periodic in nature in accordance with the variations in light reflectivities of the areas so that the signal will represent the information on the card or sheet. The signal can be used as the input for a playback device such as an audioamplifier whose output is used to power a speaker or earphone. The user of the apparatus can thus obtain the information by listening to the playback through the speaker. Other means can be used to put the information in an observable form.

By moving the information sheet or card and the light pipe at the same time, successive rows of informational areas on the card can be scanned. The rate at which the information is sensed and thereby converted into a usable form can be varied as desired by merely controlling the scanning rate of the light pipe. This speed can be correlated with the response time of the playback device if desired.

Another embodiment of the invention utilizes a polygonal mirror mounted for rotation about an axis transverse to the information card. Light from a source is directed onto the mirror, then is reflected therefrom onto the card. Reflected light from the informational areas on the card is returned to the mirror, from whence it is directed to a photocell or other light sensor for playback or other purposes. The polygonal configuration of the mirror permits continuous scanning of a number of rows of informational areas, each face of the mirror being used for scanning a respective row as the mirror rotates in one direction and as the information card moves in one direction.

Various kinds of information can be stored in the form of light and dark surface areas for playback in the manner described. For example, the text of a newspaper or book can be put on a surface by a printing process especially adapted for this purpose. The differences between the various graphic language symbols will occur as changes in the lightness or darkness of the information areas.

The continuous scanning of each informational row according to the teachings of this invention permits the informational areas to be even randomly arranged so long as they remain in the row. In this way, an analogue of the information can be obtained rather than a digital-type readout such as would be obtained with a plurality of stationary light pipes positioned adjacent to a movable information storage unit.

It is the primary object of this invention to provide apparatus and a method for generating a periodic signal by continuously scanning with a light beam a plurality of light and dark informational areas of different light reflectivities arranged in a row and then sensing the reflected light from the areas and converting it to the signal, to retrieve the information from the areas so that it can be put into an observable form.

Another object of the invention is to provide apparatus and a method of the type described wherein a number of the informational rows can be successively scanned so that a relatively large amount of information can be continuously read out or retrieved.

Another object of this invention is to provide apparatus of the aforesaid character wherein a shiftable light directing member, such as a rotatable light pipe or polygonal mirror, is used to direct light from a source onto the surface having the information to be retrieved and to receive and direct the reflected light from the surface to a photosensitive device, all of which is accomplished as the light-directing member and the information surface move along respective paths so that uninterrupted scanning of a number of rows of informational areas on the surface can be achieved until all of the information has been read out or retrieved.

The apparatus of this invention can utilize a common path for at least a major portion of both incident light path and the reflected light paths.

Other objects of this invention will become apparent as the following specification progresses, reference being had to the accompanying drawings wherein.

Figures 4, 5, 6:
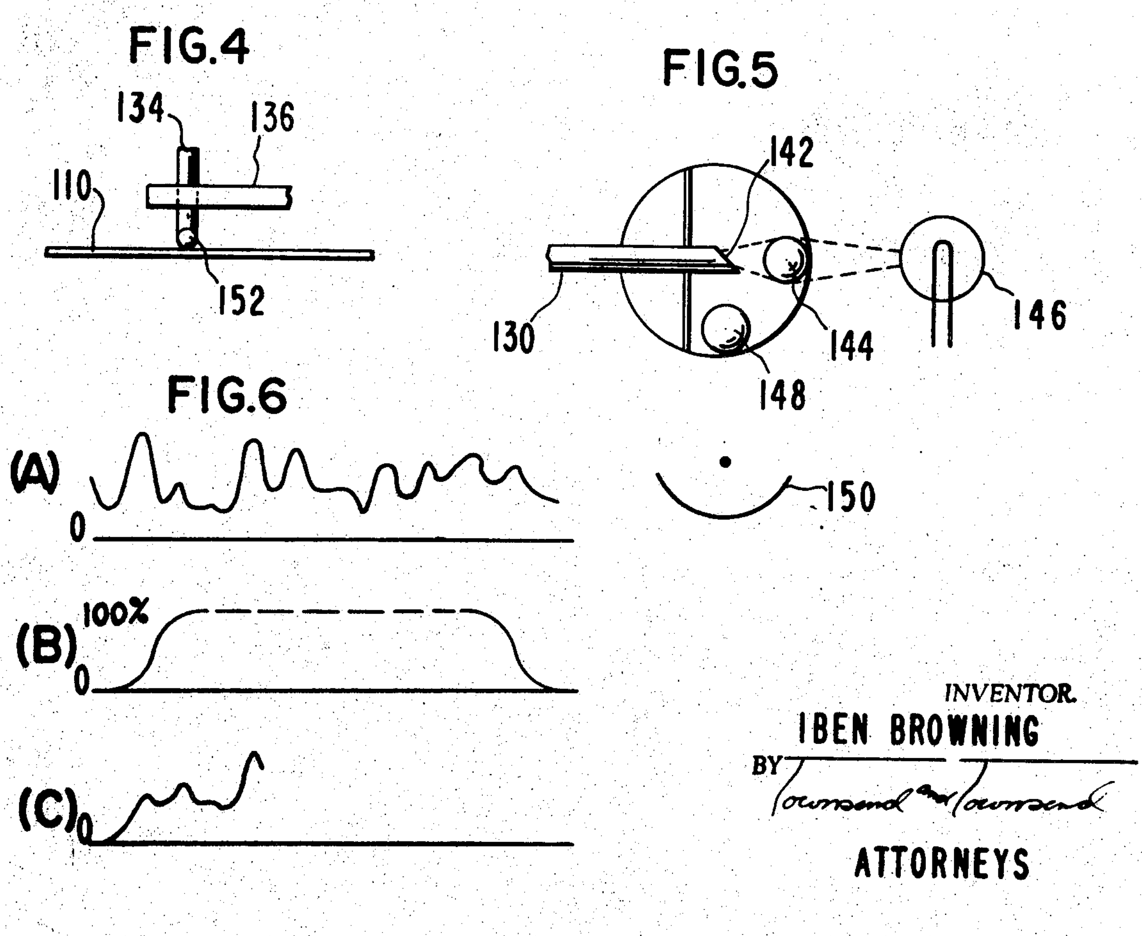
FIG. 4 is an enlarged fragmentary side view of a light pipe of the apparatus of FIG. 3.
FIG. 5 is a view showing the way in which direct light enters the light pipe of FIGS. 3 and 4 and the way reflected light leaves the same.
Figure 7:
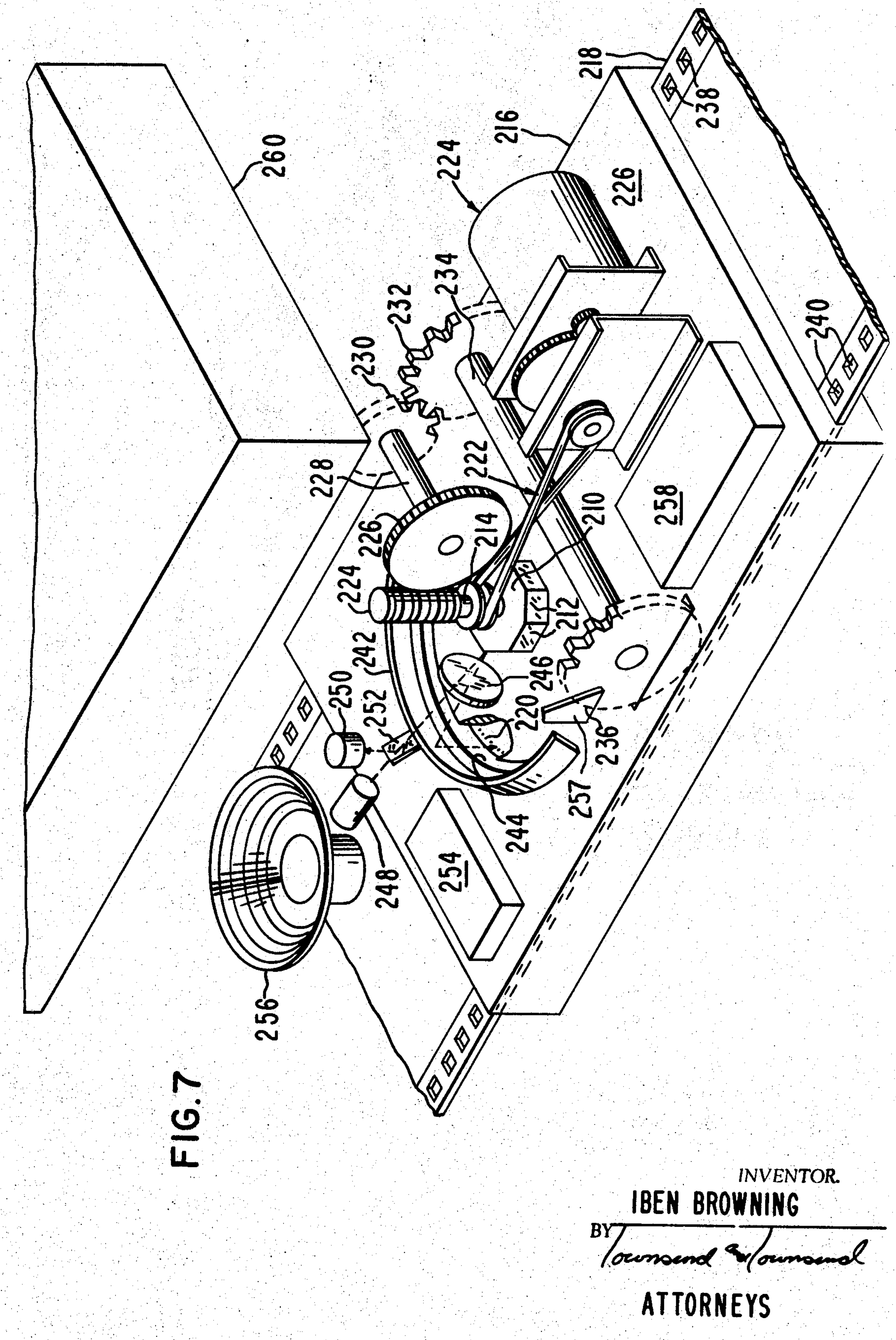

FIG. 6 'A, 6B, and 6C are graphic views of a signal representing the information to be retrieved, the signal being shown before and after passing through a progressively attenuating device or the like; and FIG. 7 is a perspective view of a third form of the apparatus.

Figure 1:
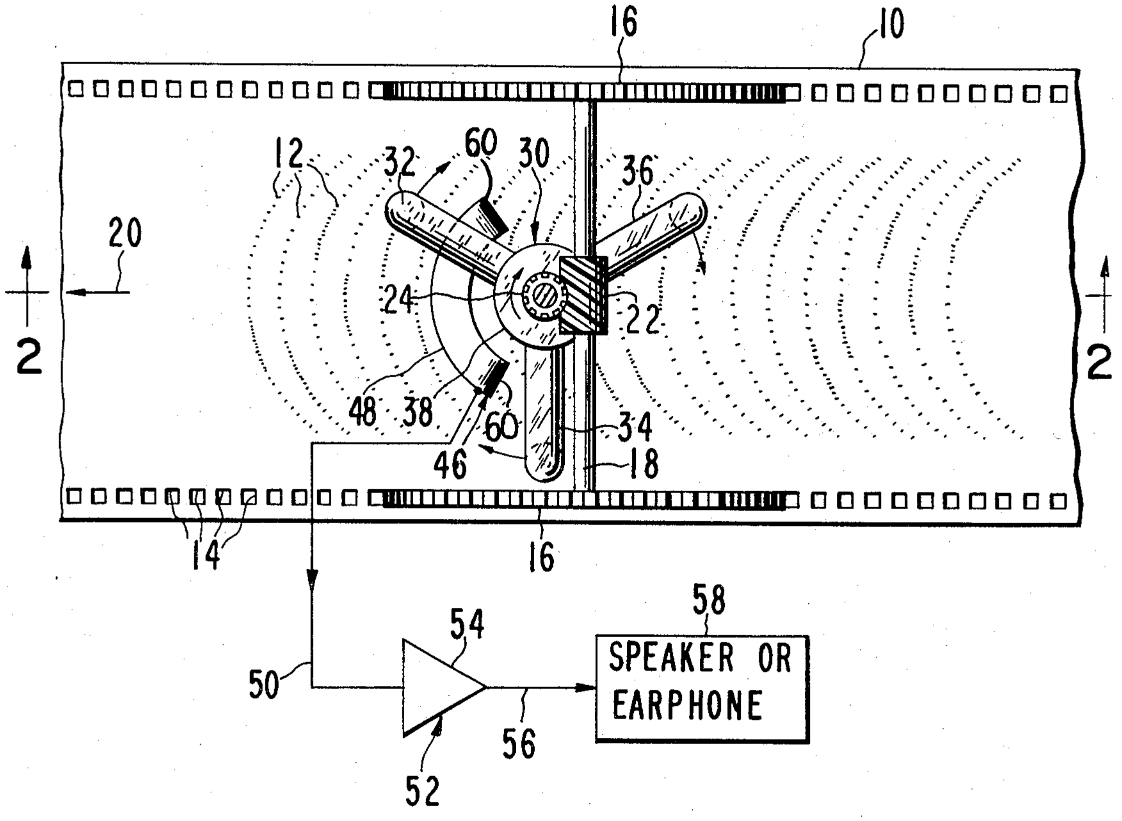
FIG. 1 is a top plan view, partly schematic and partly in section, showing one form of the apparatus.
Figure 2:
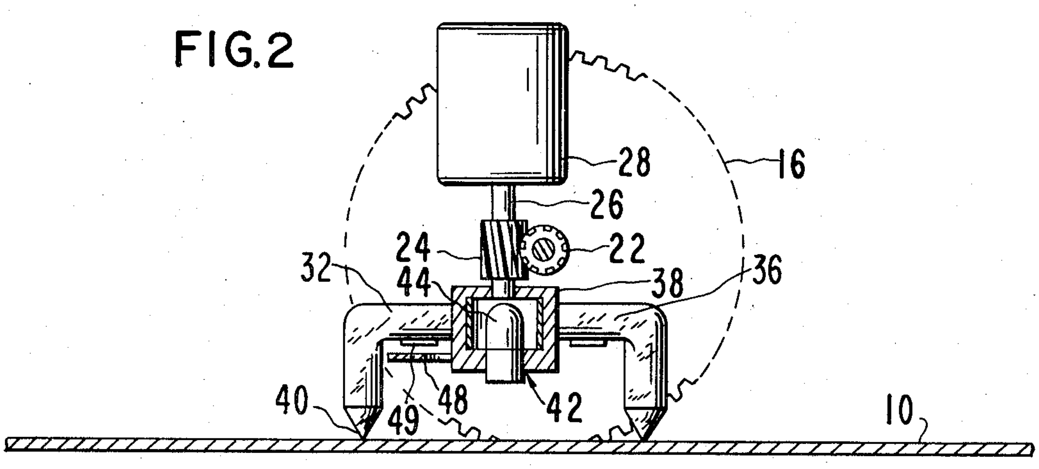
FIG. 2 is a cross-sectional view taken along line 2–2 of FIG. 1.

A first form of the information retrieval apparatus selected to illustrate the teachings of this invention is shown in FIGS. 1 and 2 and includes an information storage unit or member 10 which, for purposes of illustration, is a flat card or sheet having a plurality of arcuate rows 12 of light and dark areas thereon. The dark areas are denoted by dots and the light areas are denoted by spaces between the dots but it is to be understood that this manner of illustrating the areas is merely descriptive and not to be considered as limiting the invention to these types of areas. The arrangement and relative orientation of the areas depend, of course, upon the information to be stored and each area will have a light reflectivity characteristic of it. Moreover, adjacent areas will merge with each other, be discontinuous or be a combination of both to provide the requisite informational character or characters.

Member 10 is movable relative to light-sensing means hereinafter described and, to this end, is formed from a material permitting it to have a number of marginal edge sprocket openings 14 at its opposed sides. These openings receive the teeth of a pair of drive sprockets 16 secured to the ends of a shaft 18 extending transversely of member 10. Member 10 is advanced in the direction of arrow 20 in response to the clockwise rotation of sprockets 16 as viewed in FIG. 2. A single sprocket and a single row of holes on one side of member 10 could be used if desired. Also, structures other than a sprocket could be employed for moving member 10.

Shaft 18 has a worm gear 22 thereon which is coupled to a worm 24 mounted on the drive shaft 26 of a motor 28. The motor is secured in any suitable manner adjacent to the path of travel of member 10 and, in the illustrated embodiment of FIGS. 1 and 2, the motor is spaced above member 10. Suitable controls (not shown) are coupled with the motor to selectively actuate and deactuate the same.

Light pipe structure 30 is disposed directly above member 10 for optical contact with the upper face thereof whereby the rows 12 of light and dark areas can be scanned as member 10 advances in the direction of arrow 20. Structure 30 includes one or more light pipes for directing light onto member 10 and then for picking up the reflected light therefrom. For purposes of illustration, three L-shaped light pipe sections 32, 34 and 36 are provided and are secured to and extend outwardly from a tubular hub 38 secured to the lower end of drive shaft 26. Thus, the hub and light pipe sections rotate about the axis of drive shaft 26 as member 10 moves forwardly. The curvature of rows 12 is made such that, for a given linear speed of member 10 and a given rotational speed of structure 30, sections 32, 34 and 36 will be in alignment with and thereby in scanning relationship to respective rows 12.

Each of the light pipe sections has a lowermost conical tip 40 which is disposed to direct light onto the upper face of member 10 as well as to receive light reflected from this upper face. Since the light and dark areas of each row 12 have different light reflectivities, the amount of light reflected from these areas will vary according to the reflectivity of each area.

The light pipe sections are arcuately spaced 120° apart and the worm means and sprockets are constructed so that a light pipe section will scan a particular row as hub 38 rotates through 120°. This means that as one light pipe section is at the end of the corresponding row, the succeeding light pipe section is at the starting position of the succeeding row. In this way, the scanning of rows 12 can be continued until all of the rows have been scanned so as to minimize the readout time and to provide uninterrupted operation of the apparatus. For those sections out of scanning relationship to member 10, it may be deemed necessary or desirable to mask their conical tips 40 so that they will not pick up extraneous light. Any suitable structure can be provided for this purpose.

A light source 42 mounted in any suitable manner in hub 38 directs light into and through the light pipe sections as they scan respective rows 12 on member 10. For purposes of illustration, source 42 includes a light bulb 44 mounted within the hub in alignment with the ends of the light pipe sections.

Light-sensing means 46 includes a photocell 48 mounted in any suitable manner above member 10 and below the arcuate scanning path of travel of each light pipe section. Photocell 48 has an arcuate length equal to this path and is disposed beneath and in alignment with a light output aperture 49 in each light pipe section. Thus, at least a portion of the reflected light entering each light pipe section can pass out of the corresponding aperture 49 and onto the photocell. The light sensed by photocell 48 will be converted into an electronic signal.

Photocell 48 is electrically coupled by a lead 50 to an electronic device 52 capable of putting the generated electronic signal into an observable form. For purposes of illustration, device 52 includes an audioamplifier 54 coupled by a lead 56 to a speaker or earphone 58. In this way, the light and dark areas may comprise the text of a book, for instance, and such text can be literally read out by sensing the light reflected from the areas and then converting the reflected light into an electronic signal which in turn can be used to power the audio system.

Signal attentuating apparatus is employed to provide a transition region at the beginning and end of each row of information to avoid a "click" or an abrupt discontinuity in the information. This apparatus can take various forms such as a progressively darkened portion 60 in the form of a film applied to the upper face of photocell 48 approaching each end thereof. Alternatively, these progressively darkened areas can be printed at the marginal regions of the information rows 12, or the signal attenuating apparatus can be provided elsewhere in the system. The effect of the attentuating apparatus is shown in FIG. 6 wherein curve A shows the signal trace of a typical row of informational areas. The signal amplitude at the beginning and end of the trace has a finite value.

Curve B shows the percentage-of-transmission characteristic through the film on the photocell from one end to the other. The left-hand curve segment of curve B represents the portion 60 at one end of the photocell 48 and the right-hand curve segment represents the portion 60 at the other end. The end curve portions of curve B correspond to parts of a cosine squared function in the preferred embodiment of this invention.

Curve C shows the signal picked up by the photocell and illustrates that the amplitude of the trace is zero at the beginning and end of the trace. The trace of curve C is the output signal from the photocell 48 so that the objectional click at the beginning and end of the scanning of each row is avoided.

In operation, member 10 is put into place beneath light pipe structure 30 and coupled with sprocket 16 so that it can be moved forwardly when motor 28 is actuated. Device 52 will be coupled to photocell 48 and motor 28 will then be actuated.

As member 10 moves forwardly, light pipe sections 32, 34 and 36 will successively scan respective rows 12 and direct light from source 42 onto the light and dark areas of the corresponding rows. The light will be immediately reflected and the reflected light will be directed into the light pipe sections. At least a portion of this reflected light will issue therefrom through respective apertures 49 and onto photocell 48. The portions of the reflected light at the beginning and end of each row will be directed through the portions 60 (cosine windows) in the manner and for the purpose described above. The photocell converts the light to a periodic electronic signal which is amplified and made audible by speaker 58.

Member 10 may contain any desired information which can be put on one face of the member by the use of areas having different light reflectivities. A suitable printer or other mechanism such as illustrated in FIGS. 1 and 2 operating to expose a photographic master can be employed to prepare the master storage member 10, and this master used to print other storage members for use in the above manner. The storage member itself can be of any construction. It may be a card of the type known as a data processing card or it could be a sheet of relatively long length or a transparency. It can be used over and over again because of the permanent nature of its informational content. It can be filed away when not in use and can be handled for processing by the use of well-known card or sheet-handling techniques.

Each light pipe section continuously scans a respective informational row so that the readout is an analogue of the information. Thus, the areas of each row need not be uniformly positioned relative to each other.

Figure 3:
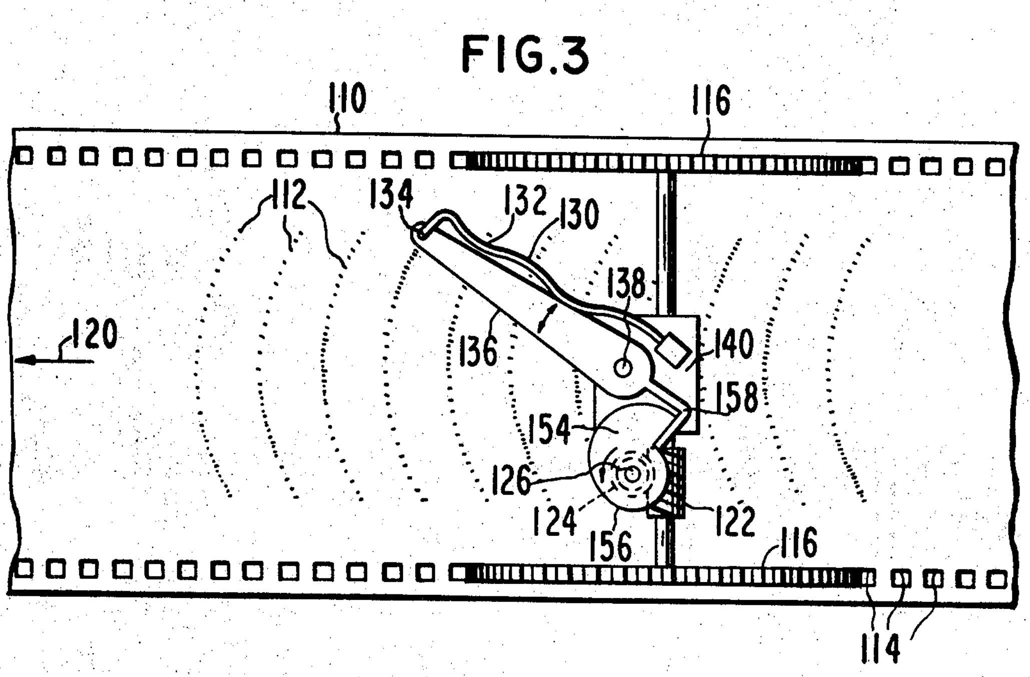
FIG. 3 is a view similar to FIG. 1 but showing another form of the apparatus.

Another form of the apparatus is shown in FIGS. 3—5 and includes a member 110 having rows 112 of light and dark areas in the same manner as member 10 of FIGS. 1 and 2. Sprockets 116 mesh with openings 114 in member 110 to advance the member in the direction of arrow 120. A worm gear 122 meshes with a worm 124 on the drive shaft 126 of a drive motor (not shown).

Light pipe structure 130 includes a light pipe 132 which is flexible and is coupled at one end 132 to a swingable arm 136. Arm 136 is secured to a shaft 138 journaled on a fixed support 140 for swinging movement about an axis perpendicular to member 110. The opposite end of light pipe 132 is carried on support 140 and, as shown in FIG. 5, has a beveled face 142 spaced from a transparent sphere 144 which serves as a lens to focus the light beam from a light source 146 carried on support 140. Light pipe 132 could be rigid instead of flexible if the proper light-receiving structure is provided at the inner end of the light pipe.

A second sphere 148 is disposed in alignment with the face 142 to focus light reflected from such inner surface onto a photocell 150. Reflected light passes through light pipe 132 toward face 142 and at least a portion of this reflected light is reflected by the aforesaid inner surface.

FIG. 4 illustrates the first-mentioned end of light pipe 132. A sphere 152 is secured to this end for making optical contact with the light and dark surfaces of member 110. Sphere 152 serves as a lens to focus the light beam to a fine point.

Arm 136 is reciprocated by means of a cam 154 having a cam surface 156 engaged by an outer end of an L-shaped arm 158. Arm 158 is rigid to arm 136 for movement therewith. The configuration of cam surface 156 provides the desired movement of arm 136 and cam 154 is secured to shaft 126 for rotation therewith.

A progressively attenuating device is provided for the form of the apparatus of FIGS. 3—5 for the purpose described above with respect to the portion 60 of the apparatus of FIGS. 1 and 2. As alternatives to the embodiments described above the attenuating device can be programmed into the amplifier used for playback purposes or it can be placed by way of a partial shutter in the optical pickup system at the inner end of the light pipe. In the first alternative, the progressively alternating device can be an electrical device wherein a signal is generated with its frequency synchronized with the scanning rate and the amplitude of the signal controlled to drop off at the ends of the scanning step. In the second alternative, the shutter can be geared to the scanning movement of the light pipe.

In use, a motor coupled to shaft 126 rotates cam 154 as sprockets 116 are rotated. Thus, light pipe 132 scans succeeding rows 112 on member 110 as the latter moves in the direction of arrow 120. Light is, therefore, directed from source 146 through light pipe 132 and onto the informational areas of member 110. Any light reflected, at least partially passes into the light pipe immediately and is directed therethrough toward and against the inner surface of face 142. This inner surface reflects at least a certain amount of the light and directs it through means 148 and onto photocell 150. The electronic signal generated by photocell 150 is amplified in the manner described above so that the information can be made audible or visual as desired. The way in which light pipe 132 moves over member 110, therefore, allows an analogue readout of the information.

A third form of the apparatus is shown in FIG. 7 and includes a polygonal mirror 210 having a number of plane faces 212 in end-to-end relationship. For purposes of illustration only, mirror 210 has eight faces. The mirror is coupled to a shaft 214 mounted for rotation in any suitable manner above a housing 216 having a passage for allowing a web or card 218 to pass therethrough. The card has a number of rows 220 of light and dark areas which represent the information to be retrieved.

Shaft 214 and thereby mirror 210 is coupled by means of a belt and pulley unit 222 to a drive motor 224 mounted on the upper surface 226 of housing 216. By means of this construction, mirror 210 can rotate in one direction about the axis of shaft 214.

A worm 224 is mounted on shaft 214 and meshes with a worm gear 226 coupled by means of a shaft 228 to a spur gear 230. Gear 230 meshes with a sprocket 232 secured to a shaft 234 mounted for rotation about an axis parallel to surface 226. Another sprocket 236 is secured to the opposite end of shaft 234. Sprocket 232 and 236 extend into the passage of housing 216 and mesh with the sprocket holes 238 and 240 at respective sides of card 218. Thus, when motor 234 is energized mirror 210 is rotated and card 218 is advanced in one direction.

A conical section mirror 242 is mounted in any suitable manner above surface 226 adjacent to an arcuate slot 244 at housing 216. Slot 244 allows light to pass into and out of the passage after being reflected from mirror 242. A lens 246 is mounted between mirror 242 and mirror 210. A light source 248 is mounted above mirror 242, is disposed to direct light through lens 246 and onto mirror 210.

A photocell 250 is mounted above a beam-splitting, semitransparent mirror 252 which is disposed within the light path of source 248 to the rotating mirror 210. Photocell 250 is connected in any suitable manner to an electrical amplifier 254 whose output is connected to speaker 256.

The embodiment of FIG. 7 also utilizes a progressively attentuating device at each end of the optical sweep across the row of information for the purpose described above. To this end, a pair of edge barriers such as sharp straight edges 257 disposed at each end of the optical sweep along the optical path out of focus to the other elements of the system so that the edge progressively interrupts the light beam as the light beam is swept toward the barrier. This construction assures that the signal amplitudes at the beginning and end of each row 220 approaches zero. The progressively attentuating devices can be placed on mirror 242 or on film in the slot if such is determined desirable or more advantageous over the use of edge barriers.

In operation, card 218 is fitted into a passage of housing 216 and positioned so that it will be moved by the rotation of sprockets 232 and 236. When motor 224 is energized, such as by connecting it to a battery 258, shaft 214 and mirror 210 are caused to rotate at a predetermined rotational speed. Simultaneously, sprockets 232 and 236 are rotated to advance card 218 at a rate proportional to the rotation speed of mirror 210.

Source 248 will have been energized and light will be directed through mirror 252 and the lens 246 onto one of the faces 212 of mirror 210. The light will then be reflected from this face through lens 246, onto the inner face of mirror 242, through slot 244 and focused onto the particular row 220 in alignment with the beam. The arcuate length of each row 220 is determined so that there will be a face 212 for scanning each row 220, respectively. Since mirror 210 rotates, the light beam directed onto a row continuously scans the informational areas of the row to allow for an analogue readout of the information.

Light reflected from each row 220 is directed forwardly through slot 244 onto the inner surface of mirror 242, then through lens 246, onto mirror 210, onto mirror 252 and into photocell 250. Each face 212 will therefore be used for scanning the entire length of a respective row 220. As a particular face 212 approaches the end of its scanning function, the next succeeding face 212 automatically moves into its starting position with respect to the next adjacent row 212. In this way, mirror 210 permits substantially continuous scanning of the rows of informational areas on card 218 until all of the information has been read out from the card and so long as motor 224 is energized.

The information taken by reflected light off of card 218 is converted into sound by directing the output signal of photocell 250 through amplifier 254 and then to speaker 256. For purposes of illustration, the speaker is mounted within a cover 260, which can be placed on housing 216 in covering relationship to the various components mounted on surface 236. By the use of battery 258, the apparatus of FIG. 7 is rendered portable and can be carried from place to place for reading out information on cards directed through housing 216.

While several embodiments of this invention have been shown and described, it will be apparent that other adaptations and modifications can be made without departing from the true spirit and scope of the invention.

I claim:

1. Information retrieval apparatus comprising: a housing having a passage therethrough and a wall provided with an arcuate slot extending across said passage, the slot extending through the wall to said passage; an elongated sheet having a plurality of transverse rows of light and dark areas thereon providing regions of different light reflectivities, said sheet extending through said passage and being movable relative to said housing; a light source adjacent to said wall and externally of said passage, said source being disposed to direct a light beam longitudinally of said passage; a first, polygonal mirror mounted for rotation about an axis transverse to said passage and disposed in a location permitting its faces to move successively into and out of said light beam, whereby the light beam is reflected from each face aligned therewith; a second, elongated conical section mirror disposed adjacent to and along said slot externally of said passage, said second mirror being disposed to receive the reflected light from said first mirror and to direct the same through said slot and onto said sheet, whereby the light will impinge on said areas and will be reflected therefrom as a function of the reflectivities thereof, said second mirror further being disposed to receive the light reflected from said areas and to direct the last-mentioned reflected light to said first mirror, whereby the reflected light from said second mirror will impinge on said first mirror and be reflected therefrom; a power source positively coupled with said sheet and said first mirror for advancing the sheet through the passage and for rotating the mirror, the movements of the sheet and the first mirror being correlated to cause the light reflected from each face of the first mirror and directed onto the sheet to be moved in scanning relationship to a respective row of areas, whereby successive areas will be scanned as the sheet continues to advance and as the first mirror continues to rotate; a photocell mounted in a position for receiving at least a portion of the reflected light from said first mirror after the light has been reflected from said sheet; and an electronic device coupled with the photocell for converting the electronic signal received therefrom into an observable form.